(12) United States Patent
Tsai

(10) Patent No.: US 7,165,726 B2
(45) Date of Patent: Jan. 23, 2007

(54) PORTABLE ELECTRONIC DEVICE WITH A FINE-TUNABLE CAMERA MODULE

(75) Inventor: Teng-Yi Tsai, Taipei Hsien (TW)

(73) Assignee: BenQ Corporation, Tao-Yuan Hsien (TW)

( * ) Notice: Subject to any disclaimer, the term of this patent is extended or adjusted under 35 U.S.C. 154(b) by 0 days.

(21) Appl. No.: 11/164,395

(22) Filed: Nov. 21, 2005

(65) Prior Publication Data
US 2006/0196946 A1    Sep. 7, 2006

(30) Foreign Application Priority Data
Jan. 28, 2005  (TW) .............................. 94102808 A

(51) Int. Cl.
*G06K 7/10*    (2006.01)

(52) U.S. Cl. ................................................ 235/472.01
(58) Field of Classification Search ............ 235/472.01
See application file for complete search history.

(56) References Cited

U.S. PATENT DOCUMENTS

| | | | |
|---|---|---|---|
| 6,687,389 B1* | 2/2004 | McCartney et al. ........ 382/118 |
| 6,996,424 B1* | 2/2006 | Ijas et al. ................ 455/575.1 |
| 2004/0023684 A1* | 2/2004 | Sato et al. ............... 455/550.1 |

* cited by examiner

*Primary Examiner*—Uyen-Chau N. Le
(74) *Attorney, Agent, or Firm*—Winston Hsu

(57) ABSTRACT

A portable electronic device includes a housing including a hole, a camera module holder installed inside the housing, and a camera module. One end of the camera module is wedged in the hole of the housing, and the other end of the camera module is installed on the camera holder in a slidable manner for capturing images.

6 Claims, 4 Drawing Sheets

PORTABLE ELECTRONIC DEVICE WITH A FINE-TUNABLE CAMERA MODULE

BACKGROUND OF THE INVENTION

1. Field of the Invention

The present invention relates to a portable electronic device with a camera module, and more particularly, to a portable electronic device with a fine-tunable camera module.

2. Description of the Prior Art

In the modern information-oriented society, compact and portable electronic appliances are widely used in all fields, such as a means of daily communication among people for exchanging information and opinions as well as experiences.

As technology progresses, mobile phones are becoming smaller in size, meaning that limited space needs to be effectively utilized. In addition, the modules and parts need to be fixed to the mobile phone tightly and still be able to function properly. A camera module of the mobile phone can provide a function of capturing images. Due to spatial limitation, not every component of the mobile phone can be positioned in the best location, such as the camera module. In general, the assembly of the camera module includes three types. The first one is that the camera module is positioned on an external structure; the second one is that the camera module is positioned on the housing of the mobile phone instead of the external structure; and the third one is that the camera module is positioned on a circuit board or a component of the circuit board, such as a shielding case. The first one has the best assembly accuracy because of the ability to orient the camera module directly. As to the second one and the third one, because the camera module is not positioned on the external structure, there is a cumulation of errors during the assembly of the camera module and the external structure. This causes problem for positioning the camera module and results in the camera module often deviates from its desirable position for assembly.

SUMMARY OF THE INVENTION

It is therefore a primary objective of the claimed invention to provide a portable electronic device with a fine-tunable camera module for solving the above-mentioned problem.

According to claimed invention, a portable electronic device includes a housing including a hole, a camera module holder installed inside the housing, and a camera module. One end of the camera module is wedged in the hole of the housing, and the other end of the camera module is installed on the camera holder in a slidable manner.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
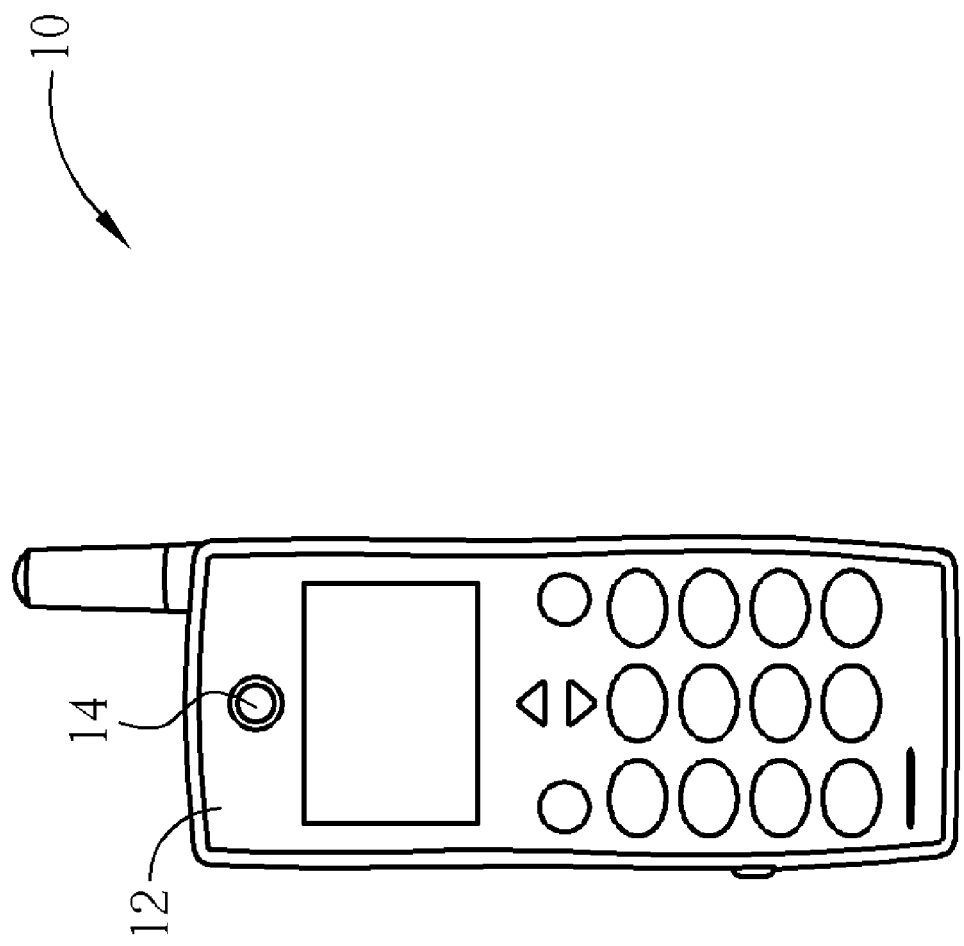
FIG. 1 is a drawing of a portable electronic device according to the present invention.

Please refer to FIG. 1. FIG. 1 is a drawing of a portable electronic device 10 according to the present invention. The portable electronic device 10 can be a mobile phone. The portable electronic device 10 includes a housing 12. The housing 12 is an external structure of the portable electronic device 10. The housing 12 includes a hole 14 positioned in a location corresponding to a lens of a camera module (not shown in FIG. 1) so that the lens of the camera module can receive light emitted or reflected from an object.

Figure 2:
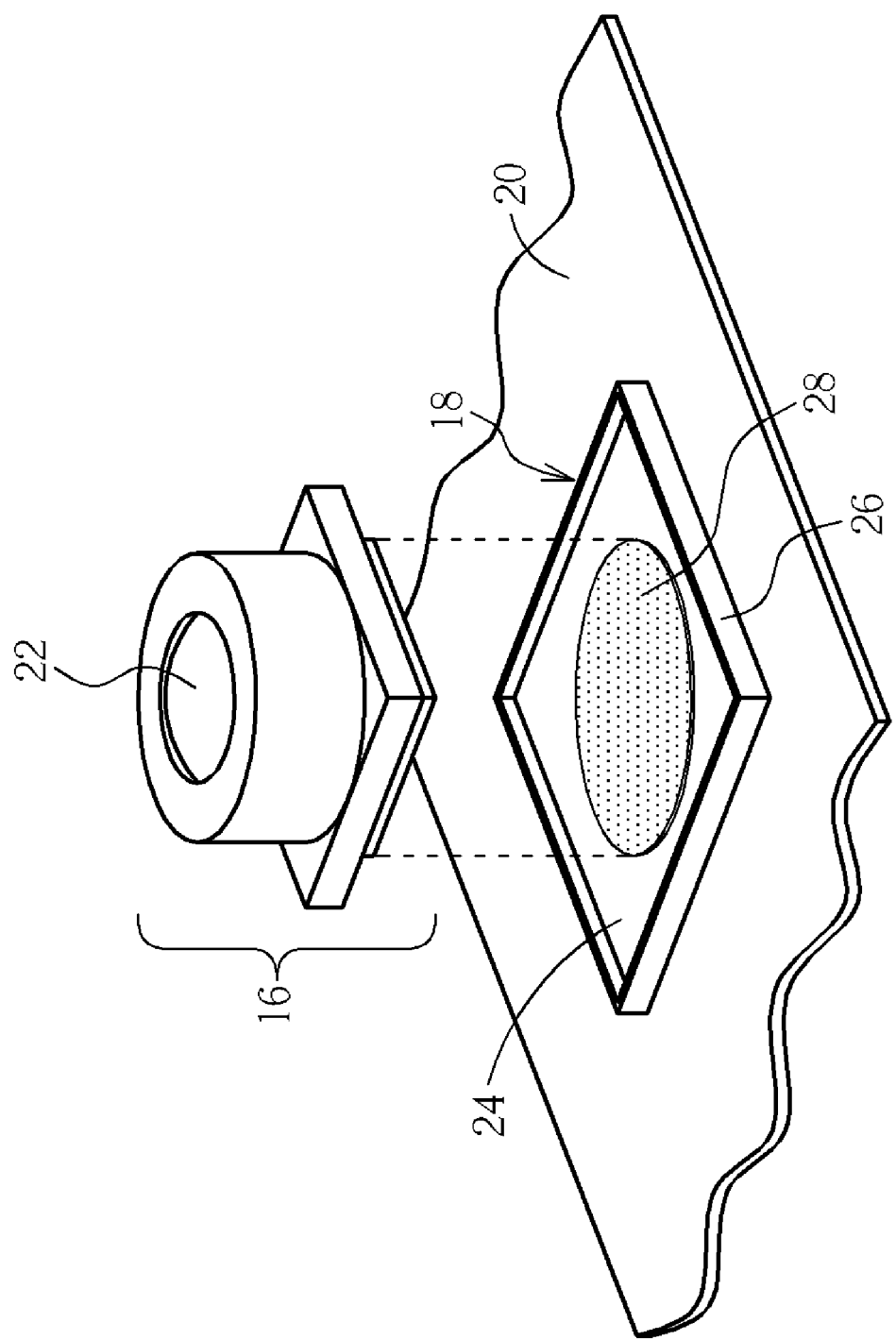
FIG. 2 is a drawing of a camera module and a camera module holder of the portable electronic device according to the present invention.

Please refer to FIG. 2. FIG. 2 is a drawing of a camera module 16 and a camera module holder 18 of the portable electronic device 10 according to the present invention. The camera module 16 and the camera module holder 18 are installed inside the housing 12 of the portable electronic device 10 as shown in FIG. 1. The portable electronic device 10 includes a circuit board 20 installed under the camera module holder 18, and the camera module holder 18 can be glued to the circuit board 20 or be connected to the circuit board 20 using other methods. The camera module holder 18 can be fixed on other components, such as a shielding case. The camera module 16 includes a lens 22 for capturing light emitted or reflected from an object. The lens 22 is positioned under the hole 14 of the housing 12 as shown in FIG. 1. The camera module holder 18 can be made of metal material. The camera module holder includes a cavity 24, and one end of the camera module 16 is installed inside the cavity 24 of the camera module holder 18 in a slidable manner. The camera module holder 18 further includes a side plate 26 installed outside the cavity 24 as a boundary for limiting the camera module 16 to slide inside the cavity 24. The portable electronic device 10 further includes a buffer medium 28 applied between a bottom surface of the camera module 16 and the camera module holder 18. The buffer medium 28 is applied inside the cavity 24, so the camera module 16 is capable of sliding inside the cavity 24 of the camera module holder 18 smoothly. The buffer medium 28 can be a lubricant in the fluid state, such as a viscous liquid.

Figure 3:
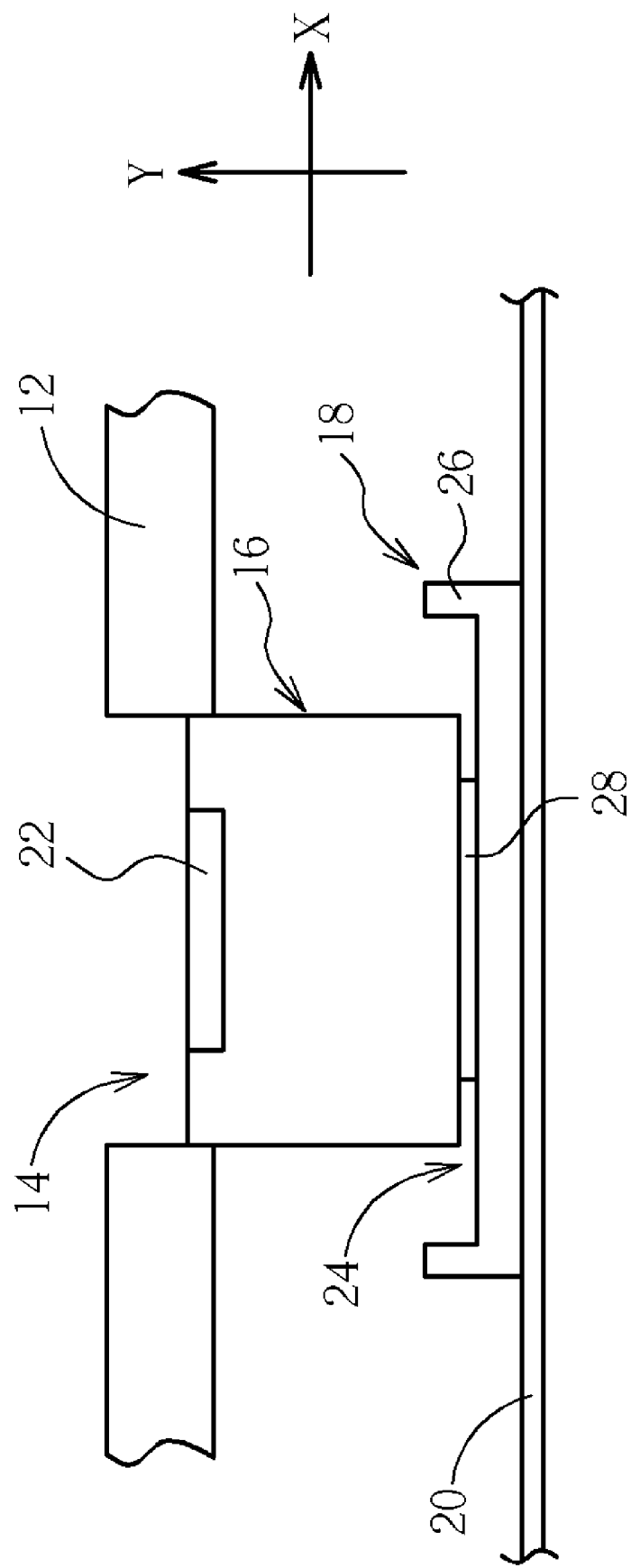
FIG. 3 is a diagram of the camera module being installed inside a hole of a housing.

Please refer to FIG. 3. FIG. 3 is a diagram of the camera module 16 being installed inside the hole 14 of the housing 12. First the camera module holder 18 can be fixed on the circuit board 20 or another internal structure. Then one end of the camera module 16 can be positioned inside the cavity 24 of the camera module holder 18, leaving a proper gap between the camera module 16 and the side plate 26 of the camera module holder 18 in the X direction. Because the buffer medium 28 is applied between the camera module 16 and the camera module holder 18, the camera module 16 can slide inside the cavity 24 of the camera module holder 18 in the X direction. Finally the other end of the camera module 16 can be inserted into the hole 14 of the housing 12 so that the lens 22 of the camera module 16 can be positioned under the hole 14 of the housing 12 precisely.

Figure 4:
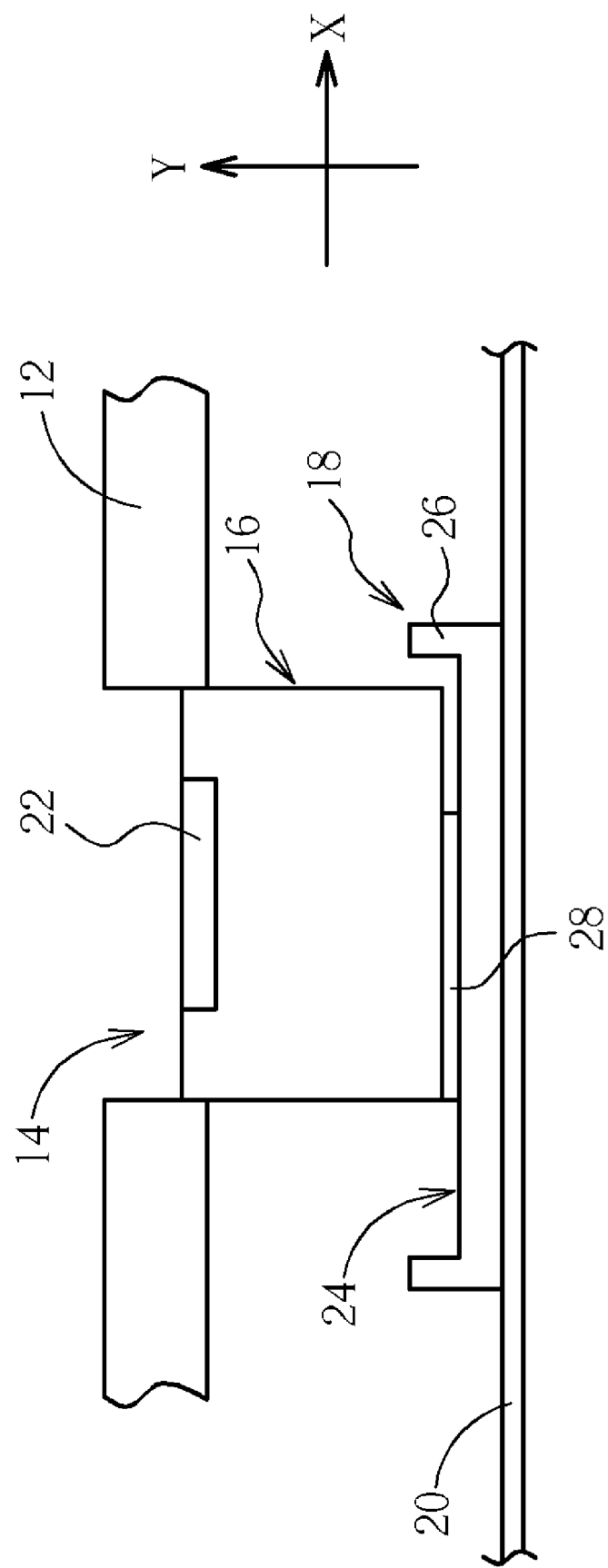
FIG. 4 is a diagram of the camera module being installed inside the hole of the housing after sliding in the X direction.

Please refer to FIG. 4. FIG. 4 is a diagram of the camera module 16 being installed inside the hole 14 of the housing 12 after sliding in the X direction. When one end of the camera module 16 is positioned inside the cavity 24 of the camera module holder 18 and the other end of the camera module 16 can not match the hole 14 of the housing 12 due to the tolerance, the other end of the camera module 16 can not be inserted into the hole 14 of the housing 12 smoothly. Because there is the gap between the camera module 16 and the side plate 26 of the camera module holder 18 in the X direction and the buffer medium 28 is applied between the camera module 16 and the camera module holder 18, the camera module 16 can slide in the X direction to match the hole 14 of the housing 12 so that the other end of the camera module 16 can match the hole 14 of the housing 12 and can be inserted into the hole 14.

In addition, the buffer medium 28 not only can be an interface for enabling the camera module 16 to slide in the X direction, but also can provide the adsorptive force between the bottom of the camera module 16 and the camera module holder 18 in the Y direction so that the camera module 16 can not depart from the camera module holder 18. In conclusion, the housing 12 can provide the movement restriction of the camera module 16 in the X direction, and the housing 12 and the buffer medium 28 can provide the movement restriction of the camera module 16 in the Y direction.

The method of the camera module 16 sliding on the camera module holder 18 is not limited to applying the buffer medium 28 between the bottom of the camera module 16 and the camera module holder 18. For example, the camera module 16 can slide on the camera module holder 18 by utilizing a track. The present invention includes all the methods for enabling the camera module 16 to slide on the camera module holder 18.

In contrast to the conventional portable electronic device, the portable electronic device according to the present invention can adjust the horizontal position of the camera module to match the hole of the housing and the camera module. Hence, the present invention can solve the problem in which the camera module is not positioned on the external structure and the camera module can not be positioned against the external structure precisely due to the cummulation of errors during assembly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A portable electronic device comprising:
   a housing comprising a hole;
   a camera module holder installed inside the housing;
   a cavity formed inside the camera module holder;
   a buffer medium applied on a surface of the cavity; and
   a camera module for capturing images, a first end of the camera module being wedged in the hole of the housing and a second end of the camera module located opposite the first end being disposed on the buffer medium for permitting the second end of the camera module to slide along the buffer medium when positioning the first end of the camera module in the hole of the housing.

2. The portable electronic device of claim 1 wherein the buffer medium is a lubricant in the liquid state.

3. The portable electronic device of claim 2 wherein the buffer medium is a lubricant in the liquid state of low volatility.

4. The portable electronic device of claim 1 wherein the camera module holder further comprises a side plate installed outside the cavity as a boundary for limiting the camera module sliding inside the cavity.

5. The portable electronic device of claim 1 further comprising a circuit board installed under the camera module holder, wherein the camera module holder is glued to the circuit board.

6. The portable electronic device of claim 1 being a mobile phone.

* * * * *